(12) United States Patent
Jokiel et al.

(10) Patent No.: US 8,905,481 B2
(45) Date of Patent: Dec. 9, 2014

(54) FITTING FOR A VEHICLE SEAT

(75) Inventors: Christian Jokiel, Heiligenhaus (DE);
Ulrich Lehmann, Alfter (DE)

(73) Assignee: Keiper GmbH & Co. KG,
Kaiserslautern (DE)

(*) Notice: Subject to any disclaimer, the term of this patent is extended or adjusted under 35 U.S.C. 154(b) by 172 days.

(21) Appl. No.: 13/702,797

(22) PCT Filed: May 17, 2011

(86) PCT No.: PCT/EP2011/002423
§ 371 (c)(1),
(2), (4) Date: Jan. 23, 2013

(87) PCT Pub. No.: WO2011/154081
PCT Pub. Date: Dec. 15, 2011

(65) Prior Publication Data
US 2013/0214579 A1   Aug. 22, 2013

(30) Foreign Application Priority Data
Jun. 9, 2010 (DE) .......................... 10 2010 023 966

(51) Int. Cl.
*B60N 2/235* (2006.01)
*B60N 2/225* (2006.01)

(52) U.S. Cl.
CPC ............ *B60N 2/2252* (2013.01); *B60N 2/2254* (2013.01)
USPC ........................................................ 297/362

(58) Field of Classification Search
USPC ................. 297/362, 362.12, 364, 366, 367 R
See application file for complete search history.

(56) References Cited

U.S. PATENT DOCUMENTS

| 6,799,806 | B2 | 10/2004 | Eppert et al. | |
| 7,090,299 | B2* | 8/2006 | Lange | 297/362 |
| 7,278,689 | B2* | 10/2007 | Guillouet | 297/362 |

(Continued)

FOREIGN PATENT DOCUMENTS

| CN | 1875816 A | 12/2006 |
| CN | 101227845 A | 7/2008 |

(Continued)

OTHER PUBLICATIONS

International Search Report issued in International Application No. PCT/EP2011/002423 dated Oct. 12, 2011.

(Continued)

*Primary Examiner* — David R Dunn
*Assistant Examiner* — Timothy J Brindley
(74) *Attorney, Agent, or Firm* — Foley & Lardner LLP (57) ABSTRACT

A fitting for a vehicle seat has a first fitting part and a second fitting part in geared connection via a toothed wheel and a toothed ring, a circumferential eccentric, driven by a driver, for driving movement of the toothed wheel and the toothed ring, wherein the first fitting part receives the eccentric, which is supported on the second fitting part, wherein two wedge segments upon which a spring acts, define the eccentric, a retaining element which retains the eccentric in the non-driven state of the fitting by cooperating with at least one retaining lug of the retaining element via a toothing configured on the first fitting part, and which releases the eccentric, when it is driven by the driver, wherein the retaining element has at least one opening which is penetrated by the spring, the spring penetrates the retaining element at exactly one opening.

15 Claims, 4 Drawing Sheets

(56) References Cited

U.S. PATENT DOCUMENTS

| | | | |
|---|---|---|---|
| 7,390,061 B2* | 6/2008 | Lange | 297/362 |
| 7,648,203 B2* | 1/2010 | Voss et al. | 297/362 |
| 8,672,407 B2* | 3/2014 | Leconte et al. | 297/362 |
| 2002/0050732 A1* | 5/2002 | Koga et al. | 297/362 |
| 2007/0298891 A1* | 12/2007 | Voss et al. | 464/182 |
| 2008/0073961 A1 | 3/2008 | Wahls et al. | |
| 2009/0224588 A1* | 9/2009 | Matsumoto et al. | 297/362 |
| 2009/0224589 A1* | 9/2009 | Beneker et al. | 297/362 |
| 2012/0001471 A1* | 1/2012 | Wei | 297/362 |
| 2012/0007402 A1* | 1/2012 | Stilleke et al. | 297/362 |
| 2013/0106161 A1* | 5/2013 | Ohba et al. | 297/362 |
| 2013/0214578 A1* | 8/2013 | Stilleke et al. | 297/362 |
| 2013/0313879 A1* | 11/2013 | Bedro | 297/362 |
| 2013/0334858 A1* | 12/2013 | Chae et al. | 297/362 |
| 2014/0001806 A1* | 1/2014 | Golarz | 297/362 |
| 2014/0097659 A1* | 4/2014 | Wahls et al. | 297/362 |

FOREIGN PATENT DOCUMENTS

| | | |
|---|---|---|
| CN | 101677689 A | 3/2010 |
| DE | 44 36 101 A1 | 6/1995 |
| DE | 195 48 809 C1 | 5/1997 |
| DE | 1020070 10 078 B4 | 11/2008 |
| DE | 1020090 38 735 A1 | 3/2011 |
| WO | WO-2010/121758 A1 | 10/2010 |

OTHER PUBLICATIONS

Office Action from related German Application No. DE 10 2010 023 966.6 dtd Apr. 1, 2011.

Office Action in corresponding Chinese Patent Application No. 201180022110.2 dated Jul. 2, 2014, along with English translation, 8 pages.

* cited by examiner

Fig. 1

FITTING FOR A VEHICLE SEAT

CROSS REFERENCE TO RELATED APPLICATIONS

The present application is a National Stage of International Application No. PCT/EP2011/002423 filed on May 17, 2011, which claims the benefit of German Patent Application No. 10 2010 023 966.6 filed on Jun. 9, 2010, the entire disclosures of which are incorporated herein by reference.

The invention relates to a fitting for a vehicle seat having the features of the preamble of claim 1.

A fitting of this type is known from DE 195 48 809 C1. Without the retaining element disclosed therein, the wedge segments would move under dynamic operating conditions, i.e. during the ride, due to vibrations and strikes, such movement again being able to result in a relative movement of the fitting parts, the so-called "run-off". The spring which acts upon the wedge segments penetrates with each of its two end fingers one window-like opening of the retaining element each, wherein the two openings in their cross section are considerably bigger compared to the wire-spring diameter. The spring consequently penetrates the retaining element altogether twice. The retaining element prevents run-off by retaining on the one hand the wedge segments, by means of the edges of the openings and by means of the end fingers of the spring, and, on the other hand, by cooperating, by means of retaining lugs which are configured on it, with one of the fitting parts, more precisely with the reverse side of the external toothing of the toothed wheel which otherwise has no further function. The two end fingers of the spring move mirror-symmetrically (in the circumferential direction) together with the two wedge segments; this is why the two big openings in the retaining element are necessary in order to cover any tolerance range. This again leads to a considerable idle movement in the circumferential direction when the retaining element is released.

The object of the invention is to improve a fitting of the type mentioned in the introduction, particularly with respect to controlling the retaining element. This object is achieved according to the invention by a fitting having the features of claim 1. Advantageous configurations are the subject-matter of the subordinate claims.

By the spring penetrating the retaining element exactly once, and more precisely at exactly one opening, the control of the retaining element is independent of the tolerance-based fluctuations in the spacing (in the circumferential direction) of the wedge segments, which results in a smaller control path (i.e. actuation angle) of the driver. The retaining element retains the eccentric by the spring bearing, in the circumferential direction, against one of the two edges (i.e. the edge which is in the possible direction of rotation) of the exactly one opening. The remaining control path is at maximum the difference presenting itself in the circumferential direction between the dimension of the exactly one opening and the dimension of the spring within the exactly one opening. Each reduction of this difference with respect to the state-of-the-art is therefore an improvement, whereby, however, at least a small clearance for a movability, transversely to the circumferential direction, is available.

The opening is preferably enclosed completely by the material of the retaining element. The distance for releasing the retaining element by means of a relative movement of spring and retaining element is made available by the opening being configured in the retaining element, in the shape of an oblong hole in the radial direction. The engagement of the retaining lugs in the toothing, the movement for releasing the retaining element from the toothing by means of the driver and a pre-bias of the retaining element which preferably is configured as a retaining spring made of spring steel, too, preferably take place in the radial direction. In order to convert the rotary movement of the driver into such a movement of the retaining element, the support finger which is provided on the retaining element or the driver have a bevel which extends obliquely to the radial direction and to the circumferential direction.

The configuration of the toothed ring on the first fitting part which receives the eccentric and the configuration of the toothed wheel on the second fitting part which supports the eccentric saves material and building space, by the fact that the toothed wheel can be configured on the radially outer edge of the second fitting part and nevertheless there are sufficiently large connecting areas available on the second fitting part, for mounting the fitting. The toothed wheel on the radially outer edge of the second fitting part is then preferably engaged over by an enclosing ring which is fixed to the first fitting part. The substantially flat shape of the enclosing ring requires less material compared to the known, L-shaped profiled configuration, resulting in savings of weight and costs.

The configuration of the toothing—which is separate with respect to the toothed ring—on the first fitting part receiving the eccentric, permits to take over the concept of retaining the eccentric in the non-driven state of the fitting. During embossing of the toothed ring, an outward-facing counter-toothing is generated on its reverse side. The configuration of the toothing which is separate from the toothed ring and from its reverse side makes an adaptation of the geometries of retaining element and toothing, which saves building space, possible.

The retaining element according to the invention preferably has an annular shape, for example from two arcs, and is seated preferably on a projection of a slide bearing bush, by means of which the first fitting part receives the eccentric. Corresponding spring arms provide for a force closure. Optionally, guide sections can be provided which improve bearing on the projection. Depending on the exact bearing of the eccentric, the retaining element can be supported also on a collar or on a hub of the driver or on a driver segment.

A configuration of the retaining element, composed of spring steel, in one piece makes a simple integration of the features of the retaining element possible. For cooperating with the toothing of the first fitting part, which is preferably configured as a toothed ring with radially inward facing teeth, preferably retaining lugs are provided, which are facing radially outward. For cooperating with the eccentric, the exactly one opening is provided which is penetrated by the spring of the eccentric which is preferably composed of two wedge segments. For cooperating with the driver, support fingers are preferably provided, upon which the driver can act by means of control cams.

Compared to solutions, in which the retaining element cooperates with toothings at the slide bearing bush (DE 10 2007 010 078 B4) or at a collar of the receptacle which is coated by the slide bearing bush, the present invention has the advantage of a bigger radius of the toothing defining a bigger lever arm for the retaining power.

The use of an eccentric epicyclic gear system enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric epicyclic gear system can be driven manually or by a motor.

The retaining element primarily serves for retaining the fitting under dynamic loads. The basic component of retaining the eccentric epicyclic gear system is provided by the friction between the eccentric and one of the two fitting parts, preferably the second fitting part which preferably has a collar for supporting the eccentric. The wedge segments which define the eccentric serve for both, retaining and driving the rolling movement of toothed wheel and toothed ring. A preferably additionally provided retaining element serves for retaining the fitting under dynamic loads.

The invention can be used preferably for adjusting the inclination of the backrest of vehicle seats in motor vehicles, but it can also be used for other applications.

The invention is explained in more detail hereinafter with reference to an exemplary embodiment shown in the drawing, in which.

Figure 5:
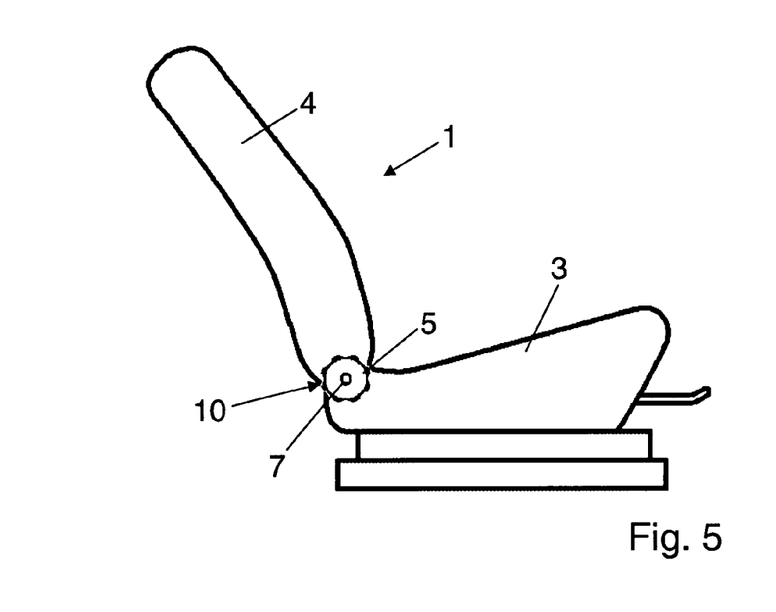
FIG. 5 shows a schematic representation of a vehicle seat.

A vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure. The drive shaft 7 defines the adopted directional data of a cylinder coordinate system.

Figure 4:
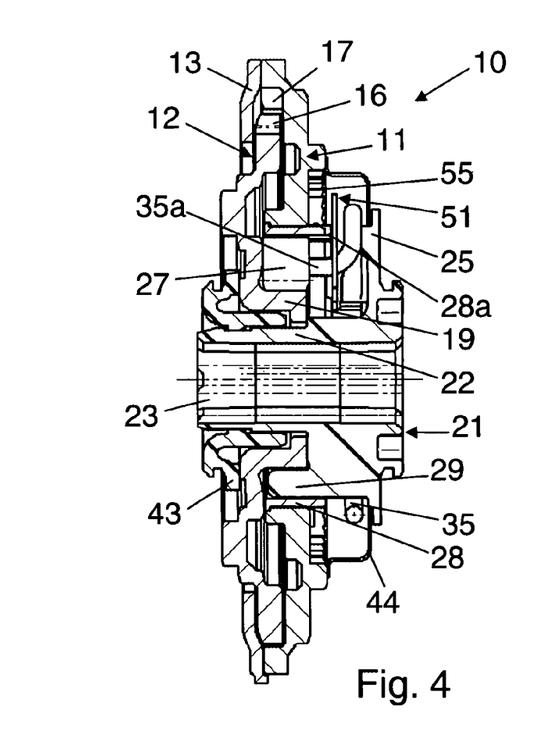
FIG. 4 shows an axial section through the fitting.

The fitting 10 has a first fitting part 11 and a second fitting part 12 which can be rotated relative to one another. Each of the two fitting parts 11 and 12 can be approximately inscribed in a circular disc shape. In order to absorb the axially acting forces, i.e. in order to hold the fitting parts 11 and 12 axially together, an enclosing ring 13 is provided. Such a method of holding parts together by means of an enclosing ring is described, for example, in U.S. Pat. No. 6,799,806 B2. The enclosing ring 13 which is preferably composed of metal is fixedly connected, for example welded or bent over, with one of the two fitting parts 11 and 12, in the present case with the first fitting part 11 in an outer end section. By means of an end section which is facing radially inward, the enclosing ring 13 engages over the other one of the two fitting parts 11 and 12, which is movable relative to it, radially outside (i.e. in its radially outer end section), optionally with the interposition of a separate sliding ring, without impeding the relative rotation of the two fitting parts 11 and 12, i.e. the enclosing ring 13 (which can have a substantially flat shape) and the fitting part 11 or 12 which is fixedly connected with it, enclose the other one of the two fitting parts 11 and 12 which is movable relative to it. From a structural point of view, the two fitting parts 11 and 12 together (with the enclosing ring 13) consequently form a disc-shaped unit.

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 can, however, also be exchanged, i.e. the first fitting part 11 would then be fixed with respect to the seat part and the second fitting part 12 would be fixed with respect to the backrest. The fitting 10 consequently is in the force flow between the backrest 4 and the seat part 3, this is why the two fitting parts 11 and 12 are composed of metal, preferably of steel.

The fitting 10 is in the form of a gear fitting in which a first fitting part 11 and a second fitting part 12 are connected to each other by means of a gear unit for adjustment and fixing in position, to be more precise, by means of an eccentric epicyclic gear system, which in the present case is self-locking as described, for example, in DE 44 36 101 A1.

In order to form the gear unit, an externally toothed toothed wheel 16 is formed on the second fitting part 12, and an internally toothed toothed ring 17 is formed on the first fitting part 11, the toothed wheel and the toothed ring meshing with each other. The diameter of the tip circle of the external toothing of the toothed wheel 16 is smaller by at least the depth of one tooth than the diameter of the root circle of the internal toothing of the toothed ring 17. A corresponding difference in the number of teeth of the toothed wheel 16 and the toothed ring 17 of at least one tooth permits a rolling movement of the toothed ring on the toothed wheel. The toothed wheel 16 and the toothed ring 17 are formed preferably by means of one single stamping process which simultaneously punches the fitting parts 11 and 12 from their initial material. Alternatively, the fitting parts 11 and 12 can be manufactured—with similar geometries and same functions—by massive forming (preferably cold-impact extrusion or hot extrusion). In the present case, the toothed wheel 16 forms the radially outer edge of the second fitting part 12, i.e. radially outward the second fitting part 12 is flush with the toothed wheel 16.

One of the two fitting parts 11 and 12, has a collar 19, in the present case the second fitting part 12, concentrically to the toothed wheel 16. The collar 19 can be integrally formed on (i.e. formed in one piece with) said fitting part as a collar formation or be secured thereto in the form of a separate sleeve. A driver 21 is supported rotatably in the collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disc 25 which is formed in one piece with the hub 22 and which has a larger diameter than the hub 22.

Supported on the collar 19—with their curved inner surfaces—are two wedge segments 27 which bear—with their curved outer surfaces—the other of the two fitting parts 11 and 12, in the present case the first fitting part 11. For this purpose, a receptacle of the last-named fitting part is coated with a slide bearing bush 28 which is preferably pressed in to be rotationally fixed, and against which the outer surfaces of the wedge segments 27 bear. The notions "support" and "bear" shall not be limited to a defined direction of the flow of forces by the fitting 10, since this direction depends on the mounting of the fitting 10.

Figure 1:
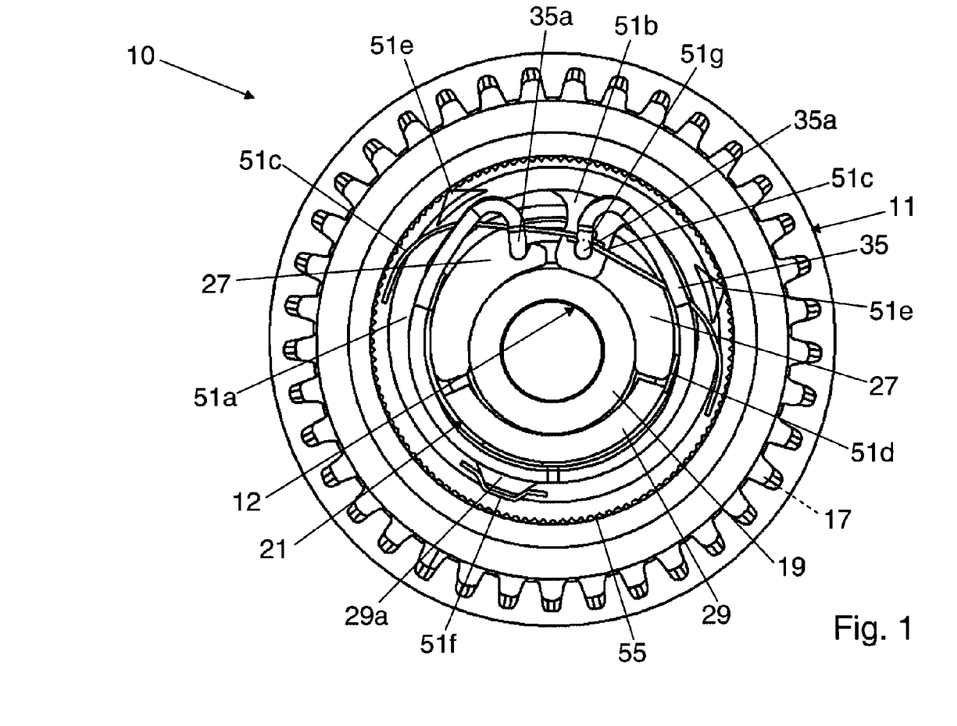
FIG. 1 shows a partial view of the fitting without hub and covering disc of the driver in the non-driven state.
Figure 2:
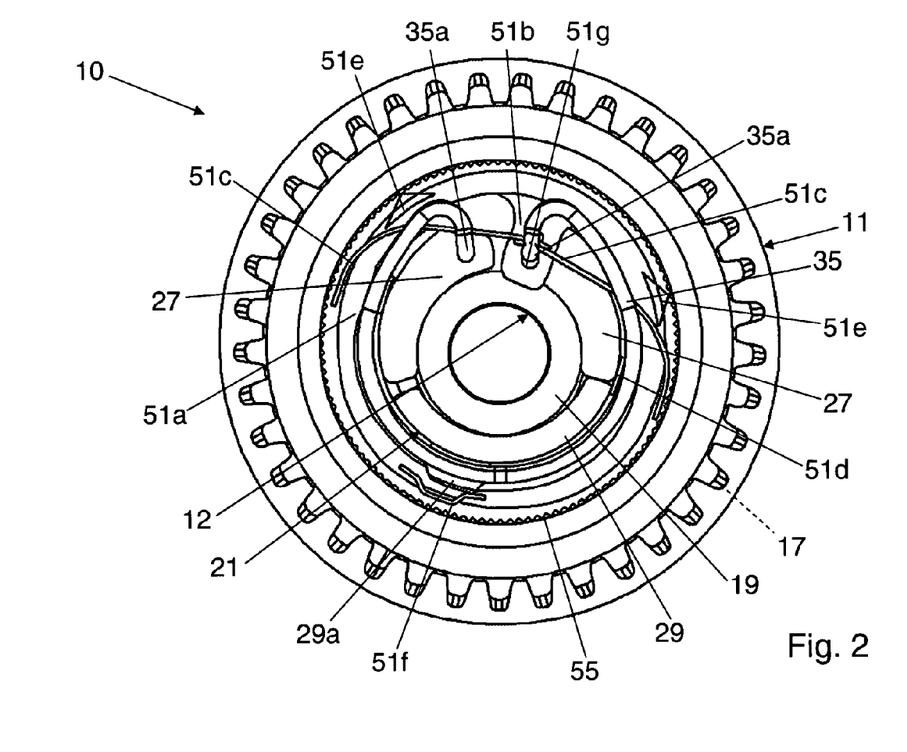
FIG. 2 shows a partial view of the fitting in the non-driven state, which corresponds to FIG. 1.

The driver 21 has—spaced radially from the hub 22—a driver segment 29 which engages with clearance between the narrow sides of the wedge segments 27 and which is formed in one piece with the covering disc 25 and the hub 22. The mutually facing broad sides of the wedge segments 27 each receive, with a respective recess defined by projecting sections of material, a respective angled end finger 35a of an omega spring 35. The spring 35 acts upon the wedge segments 27 in the circumferential direction, in particular in order to press them apart, it being possible during operation for the broad sides of the wedge segments 27 to touch and act on each other.

The driver 21 is secured axially on the outside of the fitting part provided with the collar 19 by a securing ring 43 which is preferably clipped on. The securing ring 43 extends in the axial direction along a part of the hub 22, so that the hub 22 does not directly bear against the inside of the collar 19 but, with the interposition of the securing ring 43, is supported in the collar 19 (and consequently the driver 21 is supported on the second fitting part 12). On the outside of the fitting part provided with the slide bearing bush 28 (in the present case of the first fitting part 11), a sealing ring 44 is provided between its radially outermost edge and the covering disc 25, such sealing ring being composed for example of rubber or of soft plastics material and being connected with, in particular clipped to, the covering disc 25.

The wedge segments 27 (and the spring 35) define an eccentric which, in the extension of the direction of eccentricity, presses the toothed wheel 16 into the toothed ring 17 at an engagement site. When drive is effected by means of the rotating drive shaft 7 which rotates (several times), a torque is first of all transmitted onto the driver 21 and then, by means of the driver segment 29, onto the eccentric which is so defined and which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

Figure 3:
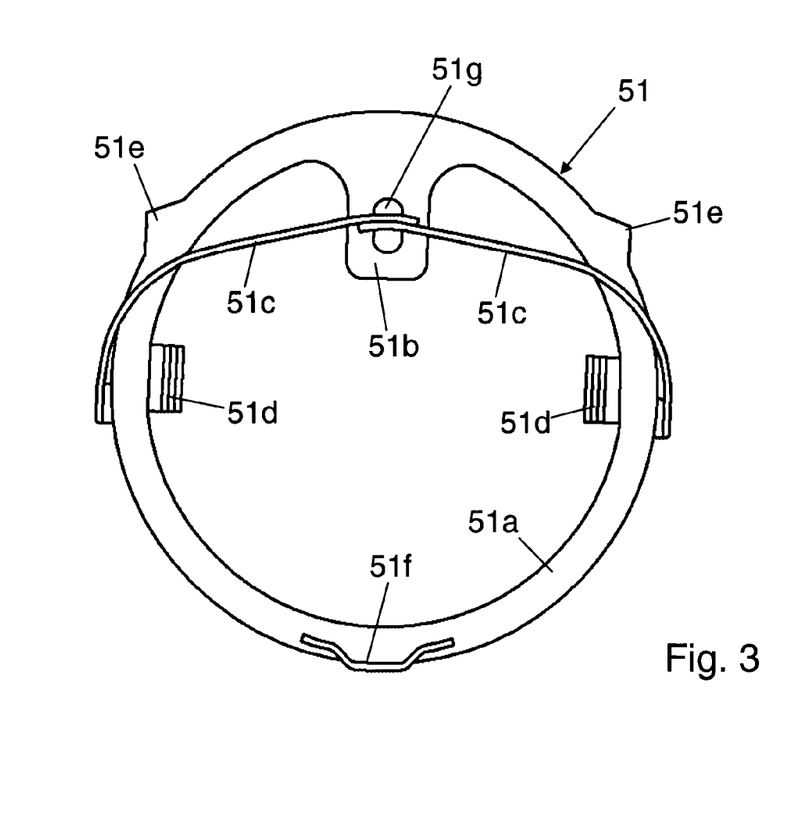
FIG. 3 shows a view of the retaining spring which serves as retaining element.

To improve the dynamic operating characteristics, a retaining spring 51, the principle function of which has been disclosed, for example in DE 195 48 809 C1, is additionally provided as retaining element. The retaining spring 51 in the present case is configured in one piece and composed of spring steel.

The substantially annular retaining spring 52 has an annular basic body 51a which is arranged in one plane in parallel to the first fitting part 11. At one point in the circumferential direction, a tab 51b faces radially inward from the basic body 51a. Two spring arms 51c are facing each another with their free ends, preferably adjacent, and are formed on the basic body 51a with their ends which face away from each other, preferably radially opposed and offset in the circumferential direction by approximately 90° with respect to the tab 51b. While the basic body 51a is within said plane in the circumferential direction and in the radial direction, the two spring arms 51c extend (also) in the axial direction between said two planes. Optionally, two guide sections 51d, which extend in the circumferential direction and which are preferably bent in a step-shaped way in the radial direction, protrude axially, such guide sections being provided preferably in the area of the spring arms 51c and being radially opposed. Two retaining lugs 51e, which are arranged in the half of the retaining spring 51 which is provided with the tab 51b with respect to the circumferential direction, protrude from the basic body 51a radially (outward). Opposed to the tab 51b, in the half which is opposed to the retaining lug 51e, the retaining spring 51 has a support finger 51f, which axially protrudes from the basic body 51a and is preferably formed on it as well. Finally, an oblong-hole-shaped opening 51g is configured in the tab 51b, said opening extending in the radial direction, i.e. the two longitudinal edges of the oblong-hole-shaped opening 51g extend (at least approximately) in the radial direction.

The slide bearing bush 28 in the present case has a bigger axial dimension than the receptacle coated by it, so that it protrudes in the axial direction over the assigned fitting part, i.e. in the present case over the first fitting part 11, defining a projection 28a. The retaining spring 51 is supported on the projection 28a of the slide bearing bush 28, by the guide sections 51d bearing against the projection 28a of the slide bearing bush 28. Cumulatively or alternatively, the guide sections 51d bear against an axially protruding edge of the receptacle which is coated by the slide bearing bush 28 and thus support the retaining spring 51.

With one of the two end fingers 35a the spring 35 penetrates an oblong-hole-shaped opening 51g exactly once, the dimension of the oblong-hole-shaped opening 51g in the circumferential direction, i.e. the distance of the two longitudinal edges from each other, and the dimension of this exactly one end finger 35a in the circumferential direction, i.e. the diameter of the spring wire, of which the spring 35 is composed, show a slight difference, for example a maximum of 3 mm, preferably a maximum of 0.5 mm, most preferably a maximum of 0.2 mm. With such clearance, a movement of the end finger 35a in the radial direction of the oblong-hole-shaped opening 51g is made possible. By the end finger 35 a getting to bear against a longitudinal edge of the oblong-hole-shaped opening 51g, the spring 35 bears against the retaining spring 51 and/or its tab 51b. The pre-biased spring arms 51c are thus supported on the end finger 35a, so that the latter is located on the radially inner end of the oblong-hole-shaped opening 51a.

The retaining spring 51 cooperates with a toothing 55 on the first fitting part 11, such toothing being concentric to the slide bearing bush 28 and being arranged radially outside thereof, the teeth of such toothing facing radially inward, i.e. the toothing is configured as a further toothed ring, in the present case on the reverse side of the toothed ring 17 and concentric thereto. The retaining spring 51 retains the spring 35 and the wedge segments 27 in the non-driven state of the fitting 10, by the retaining lugs 51e engaging with the toothing 55—due to the pre-biased spring arms 51c which are supported on the end finger 35a. A movement of the wedge segments 27 is prevented by the one end finger 35a of the spring 35 bearing against the retaining spring 51, such bearing being effective in the circumferential direction, as described, since the end fingers 35a of the spring 35a are put into the wedge segments 27. Since the dimension of the oblong-hole-shaped opening 51a in the circumferential direction is only slightly bigger than the dimension of the end finger 35a in the circumferential direction, the retaining spring 51 develops its retaining effect immediately when the end finger 35a of the nearest wedge segment 27 already bears against a longitudinal edge of the oblong-hole-shaped opening 51g and otherwise at the latest with a minimum movement (movement along the path which is preset by the difference of dimensions) of the nearest wedge segment 27, i.e. with a minimum rotation of the eccentric.

A control cam 29 a is configured on the driver 21, preferably on the driver segment 29 or on the covering disc 25 or in the transition region between the two. The support finger 51f has, in the circumferential direction, a radially stepped shape, by a center section being arranged radially outside, two adjacent bevels extending obliquely inward and two end sections which are adjacent to the latter being arranged radially further inward. In the non-driven state of the retaining spring 51, the control cam 29a is in the area of the center section between the bevels.

The retaining spring 51 is released by the driven driver 21, by the latter getting to bear against the support finger 51f by means of the control cam 29a, more precisely against the bevel which corresponds to the sense of rotation. With the further rotation of the driver 21, the control cam 29*a* moves relative to the support finger 51*f* in such a way that it slides along the bevel (up to the assigned end section). Due to the radially oblique layout, the support finger 51*f* moves outward in the radial direction, i.e. the tab 51*b* on the radially opposed side of the retaining spring 51 moves radially inward, guided by the enclosed end finger 35*a* of the spring 35 in the oblong-hole-shaped opening 51*g*. At the same time, the retaining lugs 51*e* are pulled out of the toothing 55, until they are completely out of engagement. Contemporaneously or afterwards, the driver segment 29 gets to bear against the lagging one of the two wedge segments 27, after which the eccentric starts to rotate (circulate). If the driver 21 is stopped, the spring arms 51*c* make the retaining lugs 51*e* engage again with the toothing 55, so that the wedge segments 27 are retained again.

LIST OF REFERENCE NUMERALS 1 vehicle seat
3 seat part
4 backrest
5 handwheel
7 drive shaft
10 fitting
11 first fitting part
12 second fitting part
13 enclosing ring
16 toothed wheel
17 toothed ring
19 collar
21 driver
22 hub
23 bore
25 covering disc
27 wedge segment
28 slide bearing bush
28*a* projection
29 driver segment
29*a* control cam
35 spring
35*a* end finger
43 securing ring
44 sealing ring
51 retaining spring, retaining element
51*a* basic body
51*b* tab
51*c* spring arm
51*d* guide section
51*e* retaining lug
51*f* support finger
51*g* (oblong-hole-shaped) opening
55 toothing

The invention claimed is:

1. A fitting for a vehicle seat, comprising:
a first fitting part and a second fitting part which are in geared connection via a toothed wheel and a toothed ring, which mesh with each other,
a circumferential eccentric, driven by a driver, for driving a relative rolling movement of the toothed wheel and the toothed ring, wherein the first fitting part receives the eccentric which is supported on the second fitting part, wherein two wedge segments upon which a spring acts, define the eccentric,
a retaining element which retains the eccentric in the non-driven state of the fitting by cooperating with at least one retaining lug of the retaining element via a toothing which is configured on the first fitting part, and which releases the eccentric, when it is driven by the driver, wherein the retaining element has at least one opening which is penetrated by the spring,
wherein the spring penetrates the retaining element at exactly one opening,
wherein the retaining element has an annular basic body and the exactly one opening is provided through a surface of the annular basic body.

2. The fitting according to claim 1, wherein the difference between the dimension of the exactly one opening in the circumferential direction and the dimension of the spring in the circumferential direction within the exactly one opening amounts to a maximum of 3 mm.

3. The fitting according to claim 1, wherein the opening is configured to be oblong-hole shaped, extending in the radial direction in the retaining element.

4. The fitting according to claim 3, wherein the retaining element has at least one spring arm which is supported on the spring and causes engagement of, on the one hand, the latter with one end of the oblong-hole-shaped opening and, on the other hand, the at least one retaining lug with the toothing.

5. The fitting according to claim 1, wherein the annular basic body has a tab which is provided with at least one of the opening and at least one guide section for bearing on the first fitting part.

6. The fitting according to claim 1, wherein the driver has at least one control cam which, when the driver is driven, cooperates with one support finger of the retaining element and releases the retaining element from the toothing.

7. The fitting according to claim 6, wherein when the driver is driven, the support finger moves in the radial direction and releases the at least one retaining lug, which protrudes radially in the opposed direction, from the toothing.

8. The fitting according to claim 1, wherein the toothed ring is configured on the first fitting part having the toothing, and the toothed wheel is configured on the second fitting part, wherein the toothing is configured on the side of the first fitting part which is faced away from the toothed ring.

9. The fitting according to claim 8, wherein the first fitting part receives the eccentric via a slide bearing bush which is concentric to the toothed ring, such slide bearing bush protruding axially with a projection over the receptacle of the first fitting part which is coated by it, wherein the retaining element is supported via at least one of a basic body and at least one guide section and at least one spring arm on the projection of the slide bearing bush.

10. The fitting according to claim 1, wherein an enclosing ring axially holds together the first fitting part and the second fitting part, forming a disc-shaped unit.

11. A vehicle seat, having at least one fitting according to claim 1, a seat part which is connected with one of the two fitting parts, and a backrest which is connected with the other one of the two fitting parts.

12. The fitting according to claim 1, wherein the difference between the dimension of the exactly one opening in the circumferential direction and the dimension of the spring in the circumferential direction within the exactly one opening amounts to a maximum of 0.5 mm.

13. The fitting according to claim 1, wherein the difference between the dimension of the exactly one opening in the circumferential direction and the dimension of the spring in the circumferential direction within the exactly one opening amounts to a maximum of 0.2 mm.

14. The fitting according to claim 5, wherein the annular basic body is composed of spring steel.

15. The fitting according to claim 7, wherein the support finger is provided with a bevel.

* * * * *